No. 764,046.

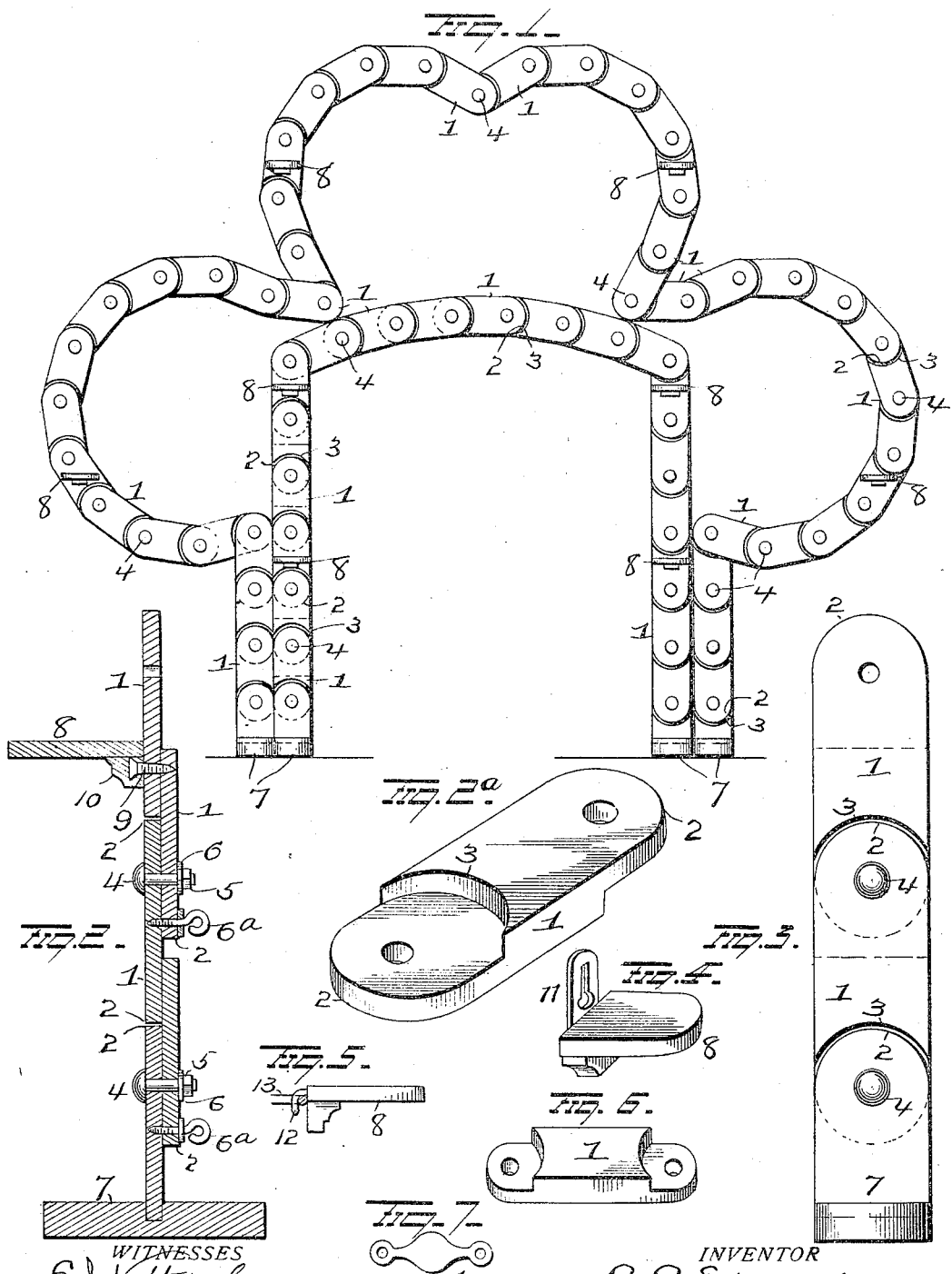

Patented July 5, 1904.

UNITED STATES PATENT OFFICE.

RICHARD R. EDWARDS, OF GALENA, ILLINOIS.

ADJUSTABLE DISPLAY-RACK.

SPECIFICATION forming part of Letters Patent No. 764,046, dated July 5, 1904.

Application filed August 24, 1903. Serial No. 170,578. (No model.)

*To all whom it may concern:*

Be it known that I, RICHARD R. EDWARDS, a resident of Galena, in the county of Jo Daviess and State of Illinois, have invented certain new and useful Improvements in Adjustable Display-Racks; and I do hereby declare the following to be a full, clear, and exact description of the invention, such as will enable others skilled in the art to which it appertains to make and use the same.

My invention relates to an improvement in adjustable display-racks, the object of the invention being to provide improvements of this character which can be adjusted into any shape desired and which is especially designed as a form for window-dressing and the like; and with this object in view the invention consists in certain novel features of construction and combinations and arrangements of parts, as will be more fully hereinafter described, and pointed out in the claims.

In the accompanying drawings, Figure 1 is a view in elevation illustrating my improvements arranged to form an ornamental design. Figs. 2, 2ª, and 3 are enlarged views of details of construction, and Figs. 4, 5, 6, and 7 are views illustrating modifications.

My improvements comprise in the main a series of links 1, each of which is made with rounded ends 2 and is provided on opposite sides at its ends with curved recesses 3 to receive the rounded recessed ends of adjacent links. The rounded overlapping ends of the links are made with alined holes for bolts 4, having nuts 5 and interposed washers 6 on their ends, the bolts serving as pivots for the links and the nuts as clamps to hold the links in any position to which they are adjusted. To further secure the links in any position, screw-eyes 6ª are located in the ends of the links and are adapted to be screwed into the overlaping link. Links may be made in one piece, as shown in Fig. 2ª, or may comprise two strips glued together, as shown in Fig. 2, and base-blocks 7 are grooved to receive end links and support the rack in a vertical position, as clearly shown in Fig. 1, which illustrates one form of ornamental design into which the rack or racks can be adjusted.

Shelves 8 are located at suitable intervals on the rack. Each shelf is provided on its under face with a block 10, secured thereto in any suitable manner, and in each block the head of a screw 9 is secured, said screw entering a link of the rack, as shown in Fig. 2, or the shelves may have slotted lugs 11, as shown in Fig. 4, to receive pins on the links or may have angular lugs 12, as shown in Fig. 5, to enter staples 13 on the links.

Instead of forming the links with recesses at opposite sides I may form both recesses on the same side, as shown in Fig. 6.

Instead of constructing the links of wood I might make them of paper or other material and of various shapes, as shown in Fig. 7, and a great many other changes might be made in the shape of the links, manner of securing them together, and in the general form and arrangement of other parts without departing from my invention, and hence I do not restrict myself to the precise details set forth, but consider myself at liberty to make such slight changes and alterations as fairly fall within the spirit and scope of my invention.

Having fully described my invention, what I claim as new, and desire to secure by Letters Patent, is—

1. An adjustable display-rack, comprising a series of links, each having a portion at each end projecting beyond the body of the link, and means for adjustably and pivotally securing said links together.

2. An adjustable display-rack, comprising a series of links, each having a portion at each end projecting beyond the body of the link, and clamping-bolts pivotally securing the projecting portions of the links together.

3. An adjustable display-rack, comprising a series of links each having a recess at each end of its body portion, clamping-bolts pivotally securing the overlapping ends of the links, and screws for securing the links at any adjustment and means for securing shelves to any of said links.

4. An adjustable display-rack, comprising a series of links recessed at both ends and pivotally secured together and means for securing them at any adjustment, base-blocks secured to end links, and shelves removably secured to any of said links.

In testimony whereof I have signed this specification in the presence of two subscribing witnesses.

RICHARD R. EDWARDS.

Witnesses:
O. C. KRAEHMER,
GEORGE T. BOND.